(12) United States Patent
Schreiber et al.

(10) Patent No.: US 9,926,968 B2
(45) Date of Patent: Mar. 27, 2018

(54) SLIDING SURFACE

(71) Applicant: MAG IAS GmbH, Eislingen (DE)

(72) Inventors: Leo Schreiber, Schwäbisch Gmünd (DE); Jürgen Reingen, Göppingen (DE); Matthias Weber, Bretten (DE); Wolfgang Hafner, Süßen (DE); Emanuel Gross, Lebach (DE); Andreas Grützmacher, Saarlouis (DE)

(73) Assignee: MAG IAS GmbH, Eislingen (DE)

( * ) Notice: Subject to any disclaimer, the term of this patent is extended or adjusted under 35 U.S.C. 154(b) by 103 days.

(21) Appl. No.: 14/912,097

(22) PCT Filed: Aug. 21, 2014

(86) PCT No.: PCT/EP2014/067839
§ 371 (c)(1),
(2) Date: Jun. 2, 2016

(87) PCT Pub. No.: WO2015/025004
PCT Pub. Date: Feb. 26, 2015

(65) Prior Publication Data
US 2016/0273576 A1    Sep. 22, 2016

(30) Foreign Application Priority Data

Aug. 21, 2013  (DE) .................. 10 2013 109 025

(51) Int. Cl.
*F16C 9/02*        (2006.01)
*F16C 33/14*       (2006.01)
(Continued)

(52) U.S. Cl.
CPC ............. *F16C 9/02* (2013.01); *B23H 3/00* (2013.01); *B23H 9/008* (2013.01); *F16C 33/102* (2013.01);
(Continued)

(58) Field of Classification Search
CPC ........ F16C 9/02; F16C 33/102; F16C 33/106; F16C 33/14; F16C 2220/68;
(Continued)

(56) References Cited

U.S. PATENT DOCUMENTS 1,581,394 A * 4/1926 Dann .................. F16C 33/24
                                                267/49
1,882,956 A * 10/1932 Sandler .................. B21B 1/227
                                                101/381
(Continued)

FOREIGN PATENT DOCUMENTS

AT    506855      12/2009
DE    1248305 B  *  8/1967  ......... C22C 32/0015
(Continued)

Primary Examiner — Marcus Charles
(74) Attorney, Agent, or Firm — Head, Johnson, Kachigian & Wilkinson, PC

(57) ABSTRACT

For friction reduction in sliding bearing, it is known to structure the sliding surface (1) by ECM by introducing a plurality of microscopic small indentations (27). According to the invention it is proposed in particular in the same process step to smoothen also the intermediary spaces (6) between the indentations (27), thus to remove the tips of the surface profile.

6 Claims, 3 Drawing Sheets

(51) Int. Cl.
*B23H 3/00* (2006.01)
*F16C 33/10* (2006.01)
*B23H 9/00* (2006.01)

(52) U.S. Cl.
CPC ............ *F16C 33/106* (2013.01); *F16C 33/14* (2013.01); *B23H 2200/10* (2013.01); *B23H 2300/10* (2013.01); *F16C 2220/68* (2013.01); *F16C 2223/06* (2013.01); *F16C 2240/54* (2013.01)

(58) Field of Classification Search
CPC .... F16C 2240/54; F16C 2226/60; B23H 3/00; B23H 2200/10; B23H 2300/10; B23H 9/008
USPC ....... 384/276, 279, 282–284, 293, 297, 300, 384/129, 385
See application file for complete search history.

(56) References Cited

U.S. PATENT DOCUMENTS

| | | | | |
|---|---|---|---|---|
| 2,242,439 | A * | 5/1941 | Shoemaker | C22C 11/02 29/898.054 |
| 2,357,106 | A * | 8/1944 | Grenot | F16C 33/14 245/1 |
| 4,658,500 | A * | 4/1987 | Engel | F16C 33/14 29/283.5 |
| 4,718,155 | A * | 1/1988 | Warriner | F16C 33/12 29/898.12 |
| 5,195,244 | A * | 3/1993 | Green | F16C 33/12 29/898.06 |
| 6,416,846 | B2 * | 7/2002 | Long | B29C 37/0085 428/209 |
| 6,464,396 | B1 * | 10/2002 | Schubert | F16C 33/14 384/273 |
| 6,491,437 | B1 * | 12/2002 | Yamada | F16C 33/14 384/284 |
| 7,025,682 | B2 * | 4/2006 | Mondry | F16D 3/33 464/11 |
| 7,118,808 | B2 * | 10/2006 | Wolki | F16C 33/28 428/613 |
| 7,617,768 | B2 * | 11/2009 | Aho | D21F 3/06 100/156 |
| 8,231,276 | B2 * | 7/2012 | Than Trong | F16C 33/201 29/898.041 |
| 2003/0024122 | A1 | 2/2003 | Ichiyama | |
| 2005/0094906 | A1 | 5/2005 | Satoh | |
| 2008/0166578 | A1 * | 7/2008 | Saxton | B22F 7/08 428/546 |

FOREIGN PATENT DOCUMENTS

| | | | | |
|---|---|---|---|---|
| DE | 3820061 | A1 * | 12/1989 | .......... F16C 33/1065 |
| DE | 19824310 | | 8/1999 | |
| DE | 19833646 | | 10/1999 | |
| DE | 102004029789 | | 1/2006 | |
| EP | 1275864 | A1 * | 1/2003 | ............ B23H 9/008 |
| EP | 1517057 | A2 * | 3/2005 | ............... B23H 9/00 |
| JP | 06267047 | A * | 9/1994 | ......... G11B 5/59633 |
| JP | 2007262977 | A * | 10/2007 | ............... F04B 1/16 |
| JP | 4075904 | B2 * | 4/2008 | |
| PL | 156671 | B1 * | 4/1992 | ............. F16C 33/34 |
| WO | WO-2005068812 | A2 * | 7/2005 | ............... F02F 1/20 |
| WO | WO-2010058530 | A1 * | 5/2010 | ............ C01B 31/02 |
| WO | WO2013182539 | | 12/2013 | |

* cited by examiner

SLIDING SURFACE

I. FIELD OF THE INVENTION

The invention relates to a sliding surface of a sliding pairing, in particular the sliding surface of radial bearing, in particular the bearings of a crank shaft in a combustion engine, on the one hand side relative to the engine block and on the other hand side relative to the piston rods.

II. BACKGROUND OF THE INVENTION

In sliding surfaces of a lubricated sliding pairing it is essential for an amount of sliding friction and also for the service life of the sliding pairing in particular of the sliding bearing that a sufficient amount of lubricant is provided in all operating conditions with an even distribution between the contact surfaces of the sliding pairing. Thus, in particular a beginning of a relative movement between the two sliding surfaces is critical.

An increasing use of start-stop installations in motor vehicles greatly emphasizes the importance of this beginning of the relative movement for bearings of a crank shaft since the number of start-up processes of the sliding bearings is increased by a factor of one hundred or more.

Therefore the contact surfaces of sliding surfaces, in particular of sliding bearings are machined so that they include microscopically small indentations which are used as a reservoir for lubricant. These indentations are provided due to a natural roughness of the material of the sliding surface or they are introduced in a controlled manner. Therefore the contact portion of a sliding bearing, thus the surface portion with which the contact surfaces are actually in contact each other is always significantly below 100%, partially even below 60%.

The respective structuring of the sliding surfaces is achieved by special machining steps like grinding, finishing, or honing wherein, however, a particular arrangement of the indentations cannot be predetermined and also the variation with respect to size, in particular depth of these indentations is relatively large. In particular the result of the structuring is also highly dependent on the experience of the person performing the process.

In order to obtain a defined structuring of the contact surface of the sliding bearing with respect to number, size, depth and distribution of the indentations it is also known to impinge the surface with a laser in order to achieve the desired indentations.

This method, however, is very time consuming for a large number of indentations and the laser beam generates an undesirable mound which envelops the indentation in a ring shape and the laser processing leads to undesirable new hardness zones.

Furthermore a machining method of electro chemical milling is known (ECM) which can also be used in a pulsed manner (PECM).

This way three dimensional surfaces are fabricated, for example the described indentations in surfaces wherein typically only a removal of 30 μm at the most is economically viable when performed by this method.

Approaching an accordingly configured electrode with a negative contour towards the surface to be processed which acts as another electrode removes material from the surface in the form of ions.

For current conduction and removing dissolved materials a current conducting liquid is pressed through the gap between tool and work piece during the entire process.

When the work pieces are crankshafts, in particular crankshafts for car engines with a high number of cylinders an additional disadvantage is that these crankshafts are instable during processing and thus difficult to position and that it is also difficult to structure these work pieces.

When the work pieces are crank shafts, in particular crank shafts for car engines with a high number of cylinders there is the additional factor that these are work pieces that are instable during machining and thus difficult to position and therefore the structuring is also difficult.

Dimensional precision of a finished crankshaft is primarily determined by assessing the following parameters in addition to maximum bearing width:

Diameter deviation=maximum deviation from a predetermined nominal diameter of the bearing pin, Circularity=macroscopic deviation from a circular nominal contour of the bearing pin determined by a distance of an outer enveloping circle and an inner enveloping circle, Concentricity=radial dimensional deviation for a rotating work piece caused by a eccentricity of the rotating bearing and/or a shape deviation of the bearing from an ideal circular shape Roughness defined by the mean single depth of roughness $R_z$=a value representing the microscopic roughness of the bearing defined by the sum of the highest profile peak and the lowest profile valley averaged over five single measuring ranges, Roughness defined by the arithmetic mean rough value $R_a$=arithmetic average of the absolute value of the coordinate value of the roughness profile inside one of said single measuring range, Roughness defined by the reduced peak height $R_{pk}$=height of the triangle having the same surface area as the summit area surfaces, wherein the triangle has a certain base length of a S-like Abott-curve; this value allows evaluation of the peak areas of a surface profile, Contact percentage=contacting surface portion of the microscopic surface structure which is in contact with a contacting opposite surface, and additionally for crank pin bearings:

Stroke deviation=dimensional deviation of the actual stroke (distance of an actual center of the crank pin from the actual center of the crank journal) from the nominal stroke, and Angular deviation in degrees or stroke related longitudinal deviation in circumferential deviation of the actual angular position of the crank pin from its nominal angular position relative to the central bearing axis and with respect to the angular position to the remaining crank pins.

Thus, maintaining the desired tolerances for these parameters is limited by the available machining methods and also by the instability of the work piece and the machining forces.

Efficiency and economics of a processing method are of great importance for practical applications, in particular for series production where cycle time and thus production cost is of great importance, whereas these limitations do not apply for a processing of test samples of prototypes.

This applies in particular for the last process steps when manufacturing for example a crankshaft, finishing and surface structuring, in particular of their bearings.

In this context it is known as a matter of principle to use the ECM method for obtaining a particular low roughness as described for example in DE 10 2008 011 893 and also from DE 10 2004 027 89.

III. SUMMARY OF THE INVENTION a) Cross References to Related Application

This application claims priority to the application DE 10 2013 109 025.7 dated Aug. 21, 2013 and PCT International Patent Application No. PCT/EP2014/067839 dated Aug. 21, 2014.

b) Technical Task

Thus, it is an object of the invention to propose a structured sliding surface and a method and a tool for producing the sliding surface which provides efficient fabrication while significantly reducing friction, in particular in a hydrodynamic sliding bearing.

c) Solution

This object is achieved by having a rotation symmetrical sliding bearing surface for a sliding movement along an opposite surface, wherein a surface of the sliding surface is structured by microscopic indentations, which comprises:

a roughness Rz is reduced compared to non structured portions in a structured portion in entire intermediary spaces between the indentations, wherein the roughness Rz in the portion between the indentations increases with increasing distance from the indentations when a distance between two adjacent indentations is
- either twice the size of the lateral extension of the electrical scatter field of one of the protrusions beyond an edge of the protrusion, or
- greater than the greatest extension of the indentation viewed in top view, otherwise the roughness Rz decreases inversely with increasing distance from the indentations. Advantageous embodiments can be derived from the dependent claims.

Alternatively this object is achieved by having a rotation symmetrical sliding bearing surface for a sliding movement along an opposite surface, wherein a surface of the sliding surface is structured by microscopic indentations, which comprises:

a roughness Rz is reduced compared to non structured portions in a structured portion in entire intermediary spaces between the indentations, wherein the intermediary spaces in the structured portion between the indentations have a roughness of 0.2 μm at the most and a roughness of 0.16 μm at the most.

With respect to the sliding surface the object is achieved in that in the structured portion in all the intermediary spaces between the indentations the roughness $R_z$ is reduced compared to the roughness $R_z$ in the non structured portions of the sliding surface.

This improves the support properties in the intermediary spaces between the indentations and reduces friction, thus to a higher extent than introducing the indentations in the structured portion alone.

The surfaces between the indentations in the structured portion shall thus have a roughness $R_a$ of 0.2 μm at the most and/or a roughness $R_{pk}$ of 0.16 μm at the most.

The roughness Rz in the portion between the indentations of the structured portion should be at least 10% less, better at least 20% less, better at least 30% less than in the non structured portion.

It has proven advantageous that the roughness Rz in the portion between the indentations of the structured portion is less than the depth of the indentations at this location, thus in particular less than 5 μm, better less than 4 μm, better less than 2 μm.

The support portion in the portion between the indentations of the structured portion should be advantageously at least 50%, better at least 75%.

The roughness Rz between the indentations should either increase or decrease with increasing distance from the indentations, depending from a distance between two adjacent indentations.

When the distance between two adjacent indentations has more than twice the size as the lateral extension of the electrical scatter field of one of the protrusions of the tool beyond an edge of this protrusion or this distance is greater than the greatest extension of the indentations viewed in top view the roughness Rz between the indentations should increase with increasing distance from the indentations. The low roughness in the surrounding portion of the indentations is then sufficient in order to cause the desired reduction of friction.

If none of the two recited conditions is present the roughness Rz between the indentations should decrease with increasing distance from the indentations. Due to the small distance in this case the required low roughness is necessary in the entire intermediary space between the indentations in order to minimize sliding friction.

Advantageously in the structured portion between the indentations the tips of the microscopic surface profile that are removed by reducing the roughness Rz should respectively generate a convex cambered surface, advantageously a semi spherical round surface, so that no level plateau of the removed tip is provided anymore. This also keeps sliding friction low.

With respect to the tool that is used for electrochemical material removal during structuring the task is accomplished in that protrusions on the effective surface of the tool have a height that is greater at least by a factor of 2, better at least by a factor of 3, better at least by a factor of 5 than a depth of indentations to be produced therewith.

The surface of the tool should have a roughness Ra in the portion between the protrusions which is 200% at the most, better only 50% at the most, better only 20% at the most of the roughness Ra of the surface to be fabricated at the respective location. This takes care of the fact that in the portion between the protrusions the distance between tool and work piece is much larger than in the portion of the protrusions itself and with an increasing distance between tool and work piece the imaging precision of the structure of the tool onto the work piece decreases.

Through a bulge at the tool respectively exactly between the protrusions the scatter field of the protrusions of the tool which may not be effective anymore in this portion can be compensated and an even reduction of the roughness Rz can be achieved over the entire gap between the protrusions.

With respect to the production method the task according to the invention is achieved in that a roughness reducing material removal is performed in the structured portion also in the surface portions between the indentations and thus by the same method and in particular in the same operating step as introducing the indentations.

Thus, structuring and introducing the indentation is advantageously performed by electrochemical material removal, in particular pulsating electrochemical material removal.

Thus it is an object of the method that material is removed from the surface in the structured portion in the entire intermediary portion between the indentations and in particular the roughness Rz is by at least 10%, better by at least 20%, better by at least 30% less than in the non-structured portion.

For this purpose the production parameters are selected accordingly, thus the height of the protrusions of the tool relative to the depth of the indentations to be fabricated and/or
the distance between the indentations, and/or
the distance between the tool and the work piece during processing.

In a rotation symmetrical sliding bearing surface the structuring is performed by introducing indentations and material removal between the indentations immediately after grinding so that the finishing step in the structured portion can be omitted in its entirety.

Since structuring is only performed where a significant loading of the rotation symmetrical sliding surface occurs there is almost no loading in the non-structured portions so that no finishing has to be performed in these portions. Thus, the finishing is overall omitted as a process step.

Structuring by introducing indentations and material removal between the indentations shall be in particular the last material removing process step before using the sliding surface bearing.

IV. DETAILED DESCRIPTION OF PREFERRED EMBODIMENTS

Embodiments of the invention are subsequently described in more detail with reference to drawing figures, wherein.

Figure 1A:
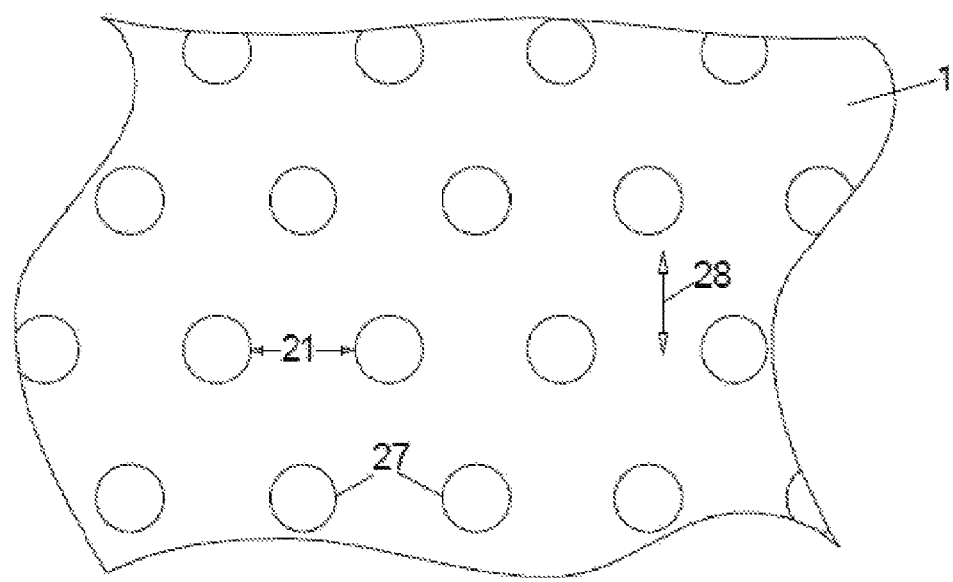
FIG. 1a illustrates a top view of a structured portion of a sliding surface.

Friction in a hydro dynamic sliding bearing in which a lubricant, typically oil is arranged between two sliding surfaces of the tribological pairing, wherein the lubricant is distributed over the sliding surface through the relative motion of the sliding surfaces and forms a sliding film in the bearing gap facilitates reducing friction when indentations 27 are introduced into the sliding surface 1 as illustrated in FIG. 1a in a top view of sliding surface 1. Depending on the lubricant used, the material and surface properties of the sliding surface and a plurality of additional parameters this effect can be reinforced by an optimized shape, size, depth, distance and other parameters of the indentations 27.

Figure 1B:
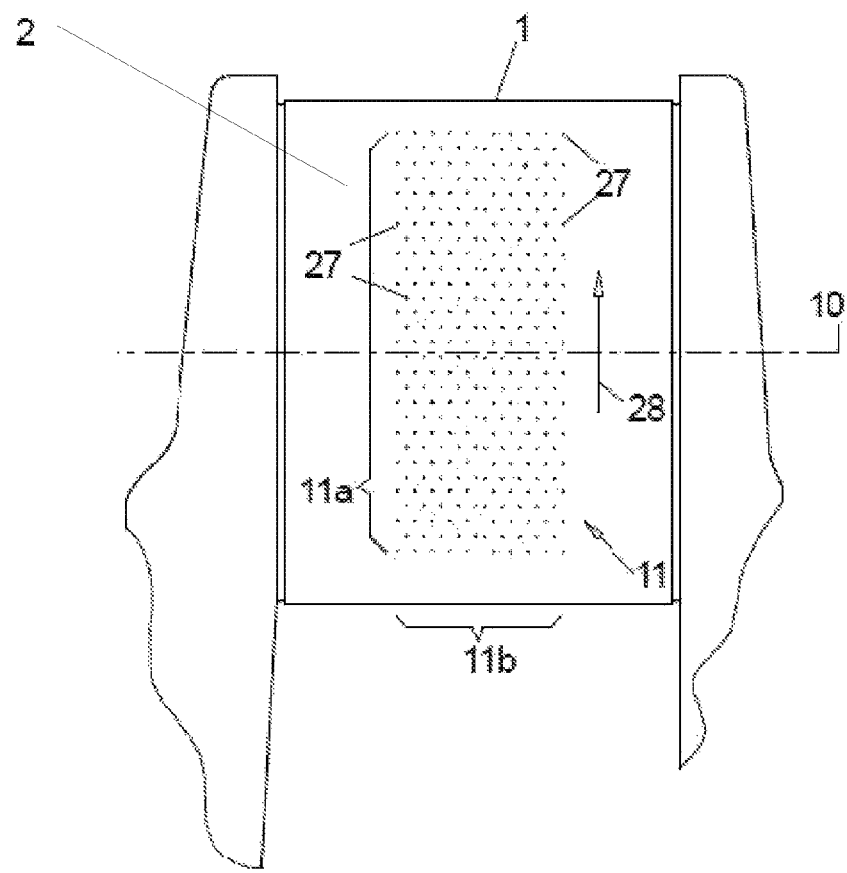
FIG. 1b illustrates an enlarged representation of a bearing of a crank shaft.

FIG. 1b illustrates a typical application of a structured sliding surface 1 represented by a bearing of a crank shaft or workpiece 2 in which typically indentations 27 are only introduced in a structured portion 11, namely in a circumferential portion 11a and typically also only in a particular width portion 11b of the total width of the bearing 1.

In order to be able to produce such indentations 27 in the μ range with a defined shape, size, depth and distance from each other in a reproducible manner in a large economical quantity electrochemical manufacturing ECM will be used.

Figure 3:
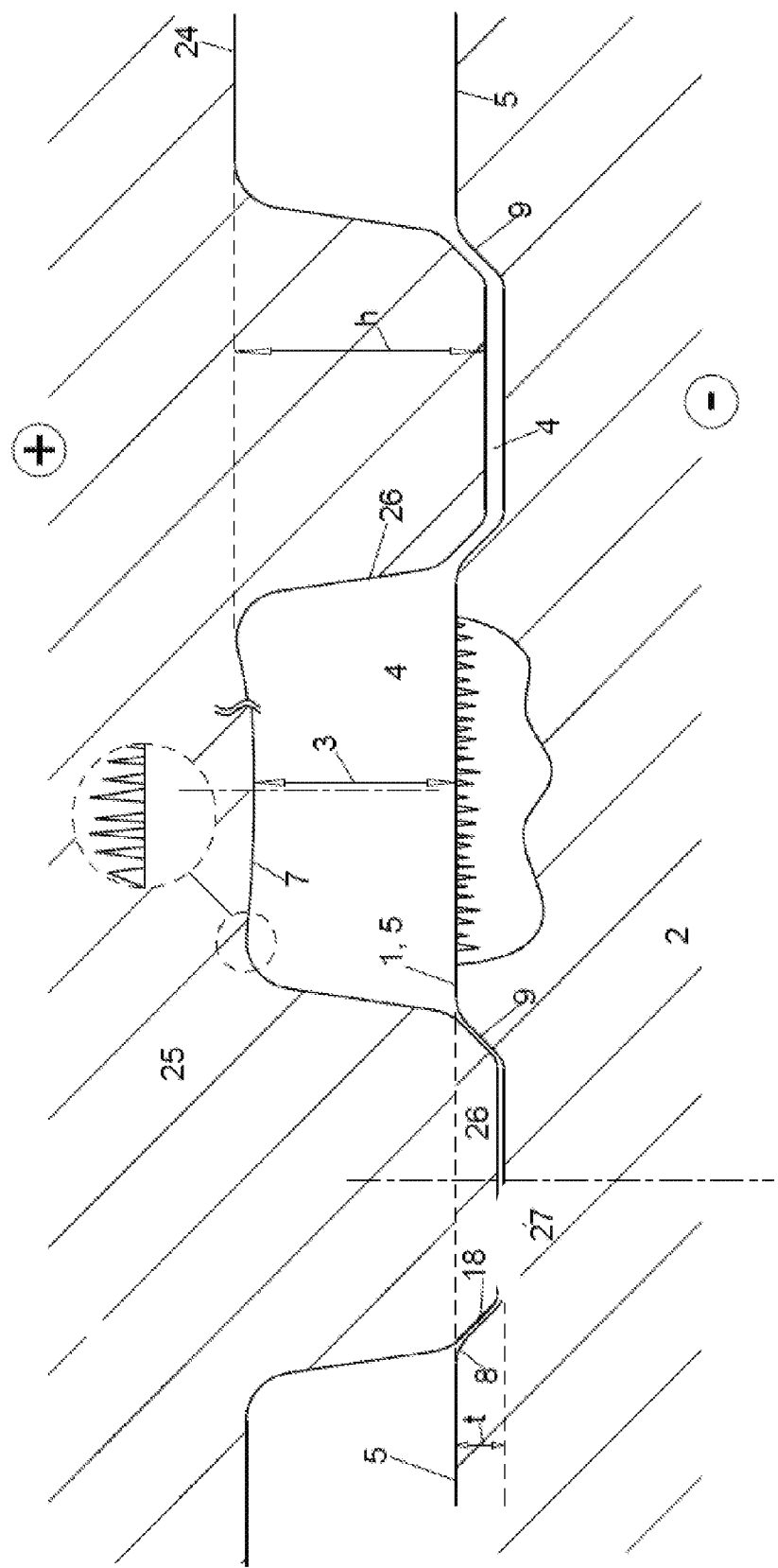
FIG. 3 illustrates an enlarged view of the tool used at the sliding surface.

As illustrated in FIG. 3, thus an electrode which typically represents the negative shape of the sliding surface 1 to be produced thus which has protrusions 26 at its effective surface is brought into a very close distance of a few μm from the sliding surface 1 that is to be processed. Metal ions are released from the surface of the work piece through an electrical current flowing from the tool 25 to the work piece 2 through an electrically conductive fluid 4, the electrolyte in the operating gap 3 there between and the protrusions of the tool 25 are imaged as indentations 27 onto the surface 1 of the work piece 2.

The surface portion of the indentations within the structured portion should thus be in a range of 15% to 40%.

The surface portion of the intermediary spaces 5 between the indentations 27 in the structured portion is thus significantly larger than the surface portion of the indentations 27.

Figure 2:
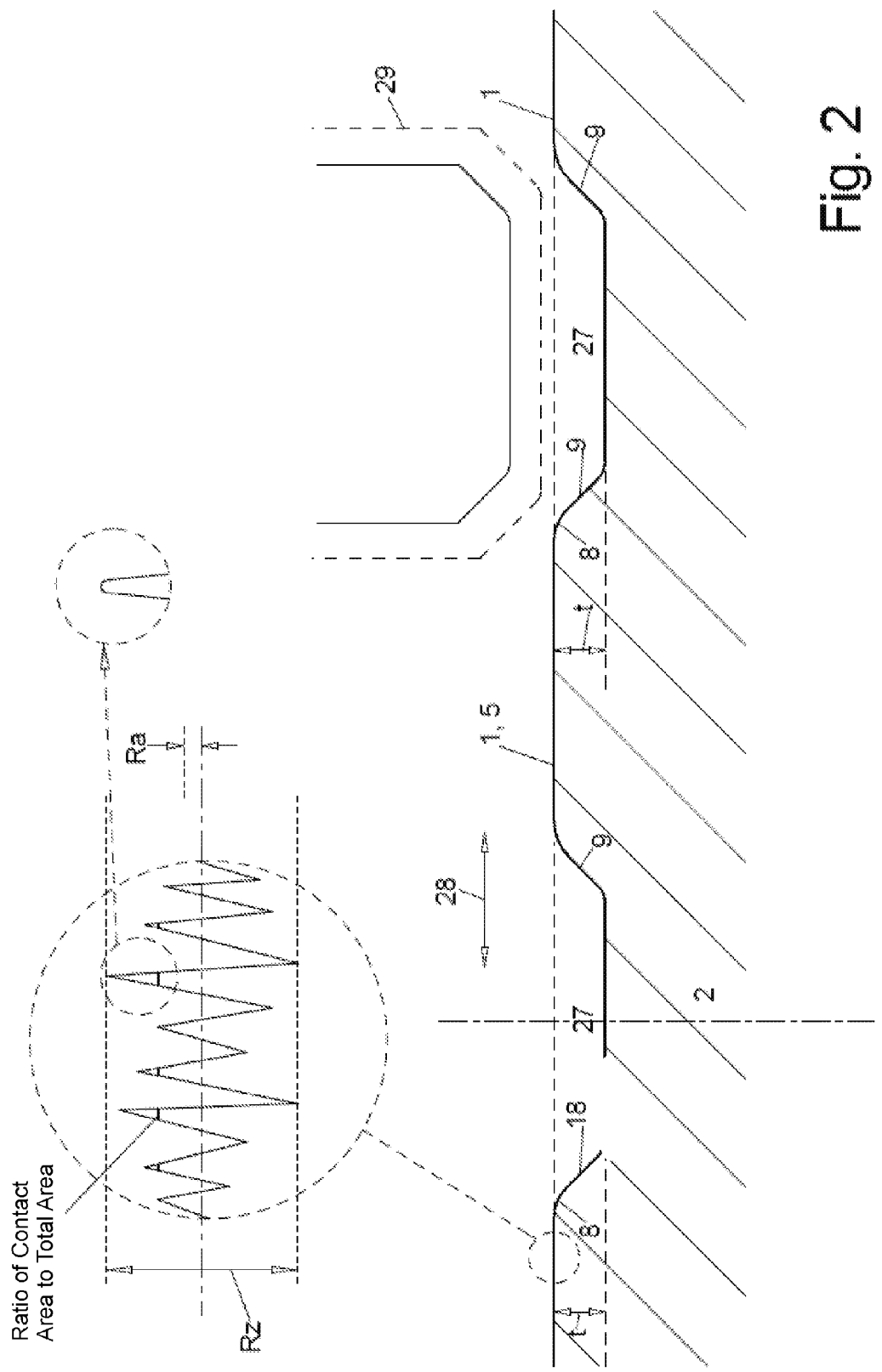
FIG. 2 illustrates a cut through indentations in the sliding surface.

The friction reducing effect of the indentations 27 is caused by the depot effect of the lubricant in that the lubricant is pulled out of the indentations 27 due to the plurality of indentations 27 which have a small absolute distance from each other in particular at a beginning of the relative movement in the sliding bearing and wherein the lubricant is distributed in the intermediary spaces 5 between the indentations 27 in the bearing gap. As illustrated in FIG. 2 at least the flank 9 of the indentation through which the lubricant is pulled out during operations of the sliding bearing is configured slanted. Typically in particular when there are circular indentations 27 all flanks 9 are configured identical and have a round shape at a transition to the intermediary spaces 5.

Since the intermediary spaces 5 between the indentations 27 still primarily bear the mechanical load of the sliding bearing. The load bearing capacity of the bearing and other properties depend from the microscopic configuration of the surface in the intermediary spaces 5, in particular their roughness and contact portion as illustrated in FIG. 2 in the enlarged cut out.

This was accomplished so far by respective mechanical processing by grinding and finishing until the desired roughness and in particular a sufficient contact portion were provided and the indentations 27 were subsequently introduced into the surface.

According to the invention introducing the indentations 27 by ECM is used in particular simultaneously to reduce the roughness Rz in the intermediary spaces 5 between the indentations 27.

FIG. 3 illustrates an option how this can be achieved by a respective configuration of the tool 25 for electrochemical material removal.

For this purpose the protrusions 26 formed on the operating surface of the tool 25 which are to be imaged into indentations 27 in the surface of the tool 2 have a substantially greater height h than a depth t of the indentations 27 to be produced therewith.

This has the effect that even for maximum approximation of the protrusions 26 to the surface of the work piece 2 even when the indentations 27 have already been partially imaged therein, also into the indentations 27 as illustrated in the left image half of FIG. 3, a much larger distance 3 remains between the protrusions 26 between the tool 25 and the work piece 2, than in the portion of the protrusions 26.

Since the material removal effect of electro chemical removal is among other things a function of the size of this distance 3 the material removal through the current flowing in the intermediary spaces 5 between the protrusions 26 from the tool 25 to the work piece 2 is lower than in the portion of the protrusions 26 but still provided.

The controlled selection of the distance 3 during maximum approximation of tool 25 and work piece 2, typically during electro chemical removal and oscillation approximation of tool and work piece is used, is coupled with a synchronous pulsating current loading, the amount of material removal in the gaps 5 can be predetermined.

The material removal in this portion can thus be adjusted so that only the tips are removed from the microscopic surface profile of the surface of the work piece, thus in particular the removed tips have a convex, in particular semi spherical contour, thus according to the enlarged representation in FIG. 2 the contact portion is increased and the roughness Rz and/or Ra is reduced.

In this context other factors are worth considering.

On the one hand side the current flow between the tool 25 and the work piece 2 does not only occur perpendicular to the macroscopic contact plane between both components but from the corners of the protrusions 26 the current also flows in a directed manner perpendicular to the surface of the tool 25, for example from its protrusions 26 in the form of a so called scatter field 29 and reaches the surface of the work piece 2, thus also in the corner portions 6 of the intermediary spaces 5 as illustrated in FIG. 2 in the right image half. Since the distances 21 between the indentations 27 as illustrated in FIG. 1a typically amount to many times the diameter of the indentations 27 the entire surface of the intermediary spaces 5 is not processed that way.

Simultaneously a current flows from the flat portions of the effective surface 24 of the tool, thus in the portion between the protrusions 26 in a direction of the intermediary spaces 5 onto the surface of the work piece 2 and overlaps in the edge portions 6 of the intermediary spaces 5 with the scatter filed 29 from the protrusions 26.

In case excessive material is thereby removed in the edge portions 6 this can be mitigated by a specific configuration of the effective surface 24 of the tool 25 in the portion between the protrusions 26, for example in that the effective surface 24 in the edge portion 6 is lowered around the protrusions 26 and includes a convex bulge 7 in the center portion there between.

It has to be furthermore considered that the microscopic structure of the surface of the tool 25 is imaged on the surface of the work piece 2 also in a portion between the protrusions 26, though with a slightly reduced imaging precision due to the larger distance.

Therefore care has to be taken that also the microscopic structure of the surface of the tool 25 in view of the provided imaging precision has predetermined parameters with respect to roughness and contact portion, thus in particular in the portion between the protrusions 26 as illustrated in FIG. 3.

Namely excessive roughness in these portions of the effective surface 24 of the tool 25 would generate a surface structure with insufficiently low contact portion and impermissibly high roughness through the electro chemical material removal in a portion where the load bearing capability of the sliding bearing namely in the intermediary spaces 5 of the surface of the work piece 2 depends from a sufficient contact portion and a required maximum roughness.

REFERENCE NUMERALS AND DESIGNATIONS

1 bearing, sliding surface
2 crankshaft, work piece
3 distance, operating gap
4 fluid, electrolyte
5 intermediary space
6 edge portion
7 convex bulge
8 round surface
9 flank
10 axial direction, rotation axis
11 structured portion
11a circumferential portion
11b width portion
24 effective surface
25 tool, electrode
26 protrusion
27 indentation
28 movement direction, rotation direction
29 scatter field
t depth
h height

The invention claimed is:

1. A rotation symmetrical sliding bearing surface for a sliding movement along an opposite surface, wherein a surface of the sliding surface (1) is structured by microscopic indentations (27), which comprises:
    a roughness (Rz) is reduced compared to non structured portions in a structured portion (11) in entire intermediary spaces (5) between the indentations (27), wherein the roughness (Rz) in the portion between the indentations (27) increases with increasing distance from the indentations (27) when a distance (21) between two adjacent indentations (27) is
        either twice the size of the lateral extension of the electrical scatter field (29) of one of the protrusions (26) beyond an edge of the protrusion (26), or
        greater than the greatest extension (E) of the indentation (27) viewed in top view, otherwise the roughness (Rz) decreases inversely with increasing distance from the indentations (27).

2. The sliding surface according to claim 1, characterized in that the intermediary spaces (5) in the structured portion (11) between the indentations (27) have a roughness (Ra) of 0.2 µm at the most and/or a roughness ($R_{pk}$) of 0.16 µm at the most.

3. The sliding surface according to claim 1, characterized in that the roughness (Rz) is at least 10% lower in the intermediary spaces (5) between the indentations (27) of the structured portion (11) than in the non-structured portion.

4. The sliding surface according to claim 1, characterized in that in the portion between the indentations (27), the surface has a roughness (Rz) which is less than the depth (t) of the indentations (27) and/or a contact portion of at least 50%.

5. The sliding surface according to claim 1, characterized in that the tips of the microscopic surface profile that are removed in the structured portion during reduction of the roughness (Rz) are respectively rounded enough so that the removed tips do not represent a plateau anymore, but a convex cambered surface.

6. A rotation symmetrical sliding bearing surface for a sliding movement along an opposite surface, wherein a surface of the sliding surface (1) is structured by microscopic indentations (27), which comprises:
    a roughness (Rz) is reduced compared to non structured portions in a structured portion (11) in entire intermediary spaces (5) between the indentations (27), wherein the intermediary spaces (5) in the structured portion (11) between the indentations (27) have a roughness (Ra) of 0.2 µm at the most and a roughness ($R_{pk}$) of 0.16 µm at the most.

* * * * *